United States Patent
Kassko et al.

(10) Patent No.: US 10,754,877 B2
(45) Date of Patent: Aug. 25, 2020

(54) SYSTEM AND METHOD FOR PROVIDING BIG DATA ANALYTICS ON DYNAMICALLY-CHANGING DATA MODELS

(71) Applicant: Datorama Technologies, Ltd., Tel-Aviv (IL)

(72) Inventors: Efraeim Cohen Kassko, Herzeliya (IL); Raanan Raz, Tel Aviv (IL)

(73) Assignee: Datorama Technologies, Ltd., Tel-Aviv (IL)

( * ) Notice: Subject to any disclaimer, the term of this patent is extended or adjusted under 35 U.S.C. 154(b) by 454 days.

(21) Appl. No.: 14/677,388

(22) Filed: Apr. 2, 2015

(65) Prior Publication Data

US 2015/0213109 A1    Jul. 30, 2015

Related U.S. Application Data (63) Continuation-in-part of application No. 14/077,951, filed on Nov. 12, 2013, now Pat. No. 10,515,386.
(Continued)

(51) Int. Cl.
*G06F 16/00* (2019.01)
*G06F 16/28* (2019.01)
(Continued)

(52) U.S. Cl.
CPC ........ *G06F 16/283* (2019.01); *G06F 16/2219* (2019.01); *G06F 16/2456* (2019.01); *G06F 16/24535* (2019.01)

(58) Field of Classification Search
CPC ......... G06F 17/30592; G06F 17/30477; G06F 17/30424; G06F 17/30554;
(Continued)

(56) References Cited

U.S. PATENT DOCUMENTS

| | | |
|---|---|---|
| 5,877,759 A | 3/1999 | Bauer |
| 5,892,905 A | 4/1999 | Brandt et al. |

(Continued)

FOREIGN PATENT DOCUMENTS

EP    0697669 A2    2/1996

OTHER PUBLICATIONS

Chandramouli et al: "Temporal Analytics on Big Data for Web Advertising." 2012 IEEE International Conference on Data Engineering, available at: https://ieeexplore.ieee.org/stamp/stamp.jsp?tp=&arnumber=6228075. (Year: 2012).

*Primary Examiner* — Michelle N Owyang
(74) *Attorney, Agent, or Firm* — Sterne, Kessler, Goldstein & Fox P.L.L.C.

(57) ABSTRACT

A system and method for providing big data analytics responsive to dynamically-changing data models are provided. The method includes parsing, based on a logical data schema, a user query into a plurality of sub-queries; sending the plurality of sub-queries to a plurality of data stores, wherein each data store is selected based on a physical data schema of a dynamic data schema; receiving a plurality of sub-result datasets, wherein each sub-result dataset corresponds to a sub-query; and combining the plurality of sub-result datasets into a single resulting data set based on a logical schema of the dynamic data schema, wherein the combining includes at least any of: an aggregation operation and a join operation.

22 Claims, 5 Drawing Sheets

Related U.S. Application Data (60) Provisional application No. 61/752,594, filed on Jan. 15, 2013.

(51) Int. Cl.
*G06F 16/22* (2019.01)
*G06F 16/2455* (2019.01)
*G06F 16/2453* (2019.01)

(58) Field of Classification Search
CPC ......... G06F 17/30551; G06F 17/30339; G06F 17/30448; G06F 17/30463; G06F 17/30466; G06F 17/30412; G06F 17/30442; G06F 17/30451; G06F 17/30498; G06F 17/30595; G06F 17/3059; G06F 16/24535; G06F 16/2456; G06F 16/283; G06F 17/2705
USPC .................................................. 707/705–780
See application file for complete search history.

(56) References Cited

U.S. PATENT DOCUMENTS

| | | | |
|---|---|---|---|
| 5,920,700 A | 7/1999 | Gordon et al. | |
| 5,979,757 A | 11/1999 | Tracy et al. | |
| 6,006,171 A | 12/1999 | Vines et al. | |
| 6,023,766 A | 2/2000 | Yamamura | |
| 7,003,560 B1 | 2/2006 | Mullen et al. | |
| 7,275,024 B2 | 9/2007 | Yeh et al. | |
| 7,315,849 B2* | 1/2008 | Bakalash | G06F 16/2455 |
| 7,421,427 B2 | 9/2008 | DeForeest et al. | |
| 7,493,311 B1* | 2/2009 | Cutsinger | G06F 16/2471 |
| 7,647,298 B2 | 1/2010 | Adya et al. | |
| 7,657,516 B2 | 2/2010 | Zaman et al. | |
| 7,747,608 B1 | 6/2010 | Gheorghe et al. | |
| 7,814,139 B2 | 10/2010 | Singh et al. | |
| 8,676,628 B2 | 3/2014 | Martignoni et al. | |
| 8,725,597 B2 | 5/2014 | Mauseth et al. | |
| 9,183,272 B1* | 11/2015 | Jonsson | G06F 17/30418 |
| 9,508,082 B1 | 11/2016 | Mannix et al. | |
| 2007/0061318 A1* | 3/2007 | Azizi | G06F 17/30386 |
| 2007/0130015 A1 | 6/2007 | Starr et al. | |
| 2007/0226339 A1* | 9/2007 | Suen | G06F 16/2457 |
| | | | 709/226 |
| 2008/0059288 A1 | 3/2008 | Kokernak | |
| 2008/0109306 A1 | 5/2008 | Maigret et al. | |
| 2009/0193006 A1* | 7/2009 | Herrnstadt | G06F 16/221 |
| 2010/0088177 A1 | 4/2010 | Lu et al. | |
| 2010/0114841 A1 | 5/2010 | Holenstein et al. | |
| 2011/0040688 A1 | 2/2011 | Ren et al. | |
| 2011/0041090 A1 | 2/2011 | Seolas et al. | |
| 2011/0246267 A1 | 10/2011 | Williams et al. | |
| 2011/0258049 A1 | 10/2011 | Ramer et al. | |
| 2011/0302025 A1 | 12/2011 | Hsiao et al. | |
| 2012/0010933 A1 | 1/2012 | Satyavolu et al. | |
| 2012/0046996 A1 | 2/2012 | Shah et al. | |
| 2012/0054143 A1 | 3/2012 | Doig et al. | |
| 2012/0130942 A1* | 5/2012 | Dipper | G06F 17/30436 |
| | | | 707/602 |
| 2012/0310730 A1 | 12/2012 | Janesky et al. | |
| 2012/0317474 A1 | 12/2012 | Parreira | |
| 2012/0323885 A1* | 12/2012 | Wang | G06F 16/2456 |
| | | | 707/714 |
| 2013/0124653 A1 | 5/2013 | Vick et al. | |
| 2013/0159081 A1 | 6/2013 | Shastry et al. | |
| 2013/0173528 A1* | 7/2013 | Betawadkar-Norwood | |
| | | | G06F 16/24535 |
| | | | 707/602 |
| 2014/0095324 A1 | 4/2014 | Cabral et al. | |
| 2014/0095473 A1* | 4/2014 | Srinivasan | G06F 16/2474 |
| | | | 707/718 |
| 2014/0200988 A1 | 7/2014 | Kassko et al. | |
| 2014/0200989 A1 | 7/2014 | Kassko et al. | |
| 2015/0379080 A1* | 12/2015 | Jochimski | G06F 16/24539 |
| | | | 707/600 |

\* cited by examiner

SYSTEM AND METHOD FOR PROVIDING BIG DATA ANALYTICS ON DYNAMICALLY-CHANGING DATA MODELS

CROSS-REFERENCE TO RELATED APPLICATIONS

This application is a continuation-in-part (CIP) of U.S. patent application Ser. No. 14/077,951 filed on Nov. 12, 2013, which claims the benefit of U.S. Provisional Patent Application No. 61/752,594 filed on Jan. 15, 2013. The contents of the above-referenced applications are hereby incorporated by reference.

TECHNICAL FIELD

The present disclosure relates generally to harnessing big data gathered by multiple data sources, and more particularly to providing multidimensional data analytics of dynamically-changing data models.

BACKGROUND

Techniques for collecting, managing, and providing real-time or near real-time relevant information have been enhanced through the use of the Internet and online research and information collection tools. One such set of tools is known as web analytics. Web analytics focuses on a company's own website for collection of online information, particularly traffic data. Web analytics are limited in that they only consider a subset of the relevant online universe, specifically the behavior of users of a given website.

Other analytics tools try to learn and predict the exposure and reach of advertisements displayed on web-sites including the social media websites. These tools gather statistics related to the reach and exposure of the advertisements. The statistics may include the number of impressions, URLs of web-pages displaying the advertisements, geographical locations of users that watched the advertisements, click-through rate of advertisements, the period of time that each viewer watched the advertisements, and so on.

Currently, every ad-serving company as well as each social media website independently gathers its own statistics and analytics with regard to the exposure and reach of advertisements. However, campaign managers who like to have better understanding about the reach and whether their budget was well spent have limited tools by which to do so. As a result, campaign managers cannot efficiently analyze and understand the performance of an advertisement campaign.

Specifically, the information gathered by a single ad-serving company or a social website per campaign may include trillions of records. When observed among different companies serving the same campaigns, these trillions of records become several times more voluminous, thereby making it almost impossible for campaign managers to analyze the gathered information using existing tools. Further, in addition to the volume of the gathered information, each ad-serving company presents the gathered statistics using a different format. This further increases the complexity of the campaign analysis.

It should be noted that failing to efficiently and accurately analyze the performance of an advertising campaign results in revenue losses for businesses, as their advertising budget is not being efficiently spent. Advertising campaigns can cost millions of dollars, and such costs may be better spent on some advertisement hosts than on others. Many businesses implement analysis of multidimensional data to compare the effectiveness of advertising campaigns among various advertising hosts and/or under different advertising conditions.

In the related art, online analytical processing (OLAP) engines supporting only processing of static datasets. An OLAP engine typically permits users to analyze multidimensional data from various perspectives. Such perspectives are based on consideration of one or more dimensions such as, for example, customers, products, and periods of time. One form of the OLAP is multidimensional OLAP (MO-LAP), which involves storing multidimensional data in an optimized multidimensional array storage. This optimized multidimensional array storage requires pre-computation and storage of information in a static data model. In contrast to OLAP, relational OLAP (ROLAP) engines support semantic datasets. That is, the ROLAP engines access a relational database and generate structured query language (SQL) queries in response to a user query.

Existing ROLAP engines typically require submission of queries in a precise format to a single data source (database) to properly generate the desired performance analysis. This precision requirement makes ROLAP engines almost unfeasible for use in retrieving data from ever-changing data models. Specifically, ROLAP engines would require submitting appropriate queries to manipulate data and/or to obtain data. As such, specific queries should be written based on the data model. Therefore, ROLAP engines largely require database administrators to write new queries, to interact with the data, and to maintain the data models. In addition, the lack of direct interactivity with a ROLAP engine does not enable business analysts to gather important insights about the data.

Further, existing OLAP and ROLAP solutions tend to struggle when dealing with data updates. As data models increasingly become ever-changing (that is, iteratively updated within increasingly narrow periods of time), providing multidimensional data analytics that are consistent with frequently changing data becomes increasingly significant. Another limitation of OLAP and ROLAP engines is that they are limited to accessing only one data source (database). Therefore, such engines are optimized and in most cases can be utilized for the retrieval and/or manipulation of big data from a single source, but cannot be effectively utilized for retrieval and/or manipulation of big data from multiple sources.

It would therefore be advantageous to provide a solution that would overcome the deficiencies of the prior art by providing big-data analytics that efficiently support ever-changing data models.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

The disclosed embodiments include a method for providing big data analytics responsive to dynamically-changing data models. The method comprises parsing, based on a logical data schema, a user query into a plurality of sub-queries; sending the plurality of sub-queries to a plurality of data stores, wherein each data store is selected based on a physical data schema of a dynamic data schema; receiving a plurality of sub-result datasets, wherein each sub-result dataset corresponds to a sub-query; and combining the plurality of sub-result datasets into a single resulting data set based on a logical schema of the dynamic data schema, wherein the combining includes at least any of: an aggregation operation and a join operation.

The disclosed embodiments include a system for providing big data analytics responsive to dynamically-changing data models, comprising: a data mart having an analytical processor; a processor; and a memory, the memory containing instructions that, when executed by the processor, configure the system to: parse, based on a logical data schema, a user query into a plurality of sub-queries; send the plurality of sub-queries to a plurality of data stores, wherein each data store is selected based on a physical data schema of a dynamic data schema; receive a plurality of sub-result datasets, wherein each sub-result dataset corresponds to a sub-query; and combine the plurality of sub-result datasets into a single resulting data set based on a logical schema of the dynamic data schema, wherein the combining includes at least any of: an aggregation operation, and a join operation.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
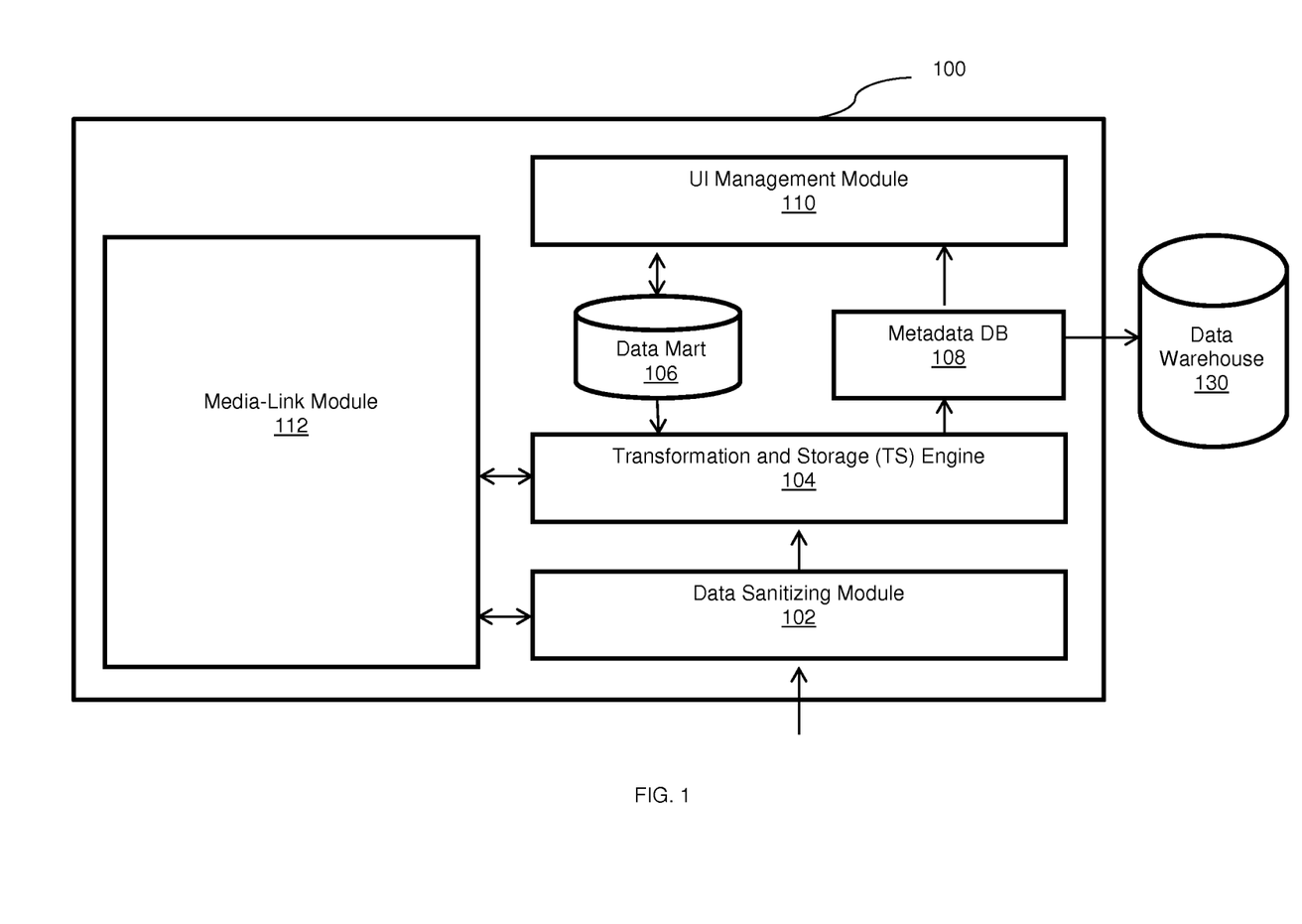
FIG. 1 is a diagram of a system for cross-platform big data analytics utilized to describe the various embodiments.

FIG. 1 shows an exemplary and non-limiting block diagram of a system 100 for cross-platform big data analytics according to an embodiment. The system 100 includes a data sanitizing module 102, a transformation and storage (TS) engine 104, a data mart module 106, a metadata database (DB) 108, a management user interface (UI) module 110, and a media-link module 112. The various embodiments for providing big data analytics on dynamically-changing data models can be conducted by the system 100, and in particular by the data mart module 106.

According to various exemplary embodiments, the data sanitizing module 102 is configured to load data into the system and to produce a dataset normalized to a predefined unified format. That is, regardless of the format or the type of the input data, the output of the data sanitizing module 102 is a data set in a unified format. In an embodiment, the type of unified format may be based on a logical schema. In a further embodiment, the logical schema is defined by the user. In another embodiment, the logical data schema may be changed at any time. The input data uploaded to the data sanitizing module 102 may be, but is not limited to, unstructured data, structured data, standardized data (e.g., Excel, XML, etc.), and so on.

The data sanitizing module 102 is configured to support both push and pull operations facilitated through a plurality of data transfer protocols. Such protocols may include, for example, FTP, SFTP, FTPS, HTTP, HTTPS, SMTP, POP3, and the like. According to one embodiment, the data sanitizing module 102 is also configured to decrypt the data if such data is received in an encrypted form. The decryption keys are provided by the entity owning the data.

The data sanitizing module 102 is configured to identify and associate the incoming data with the entity owning the data. Such an entity may be, for example, a public relations enterprise running the advertisement campaign, an advertising agency, a campaign manager, and so on. The processing of the data identification and its corresponding association may be utilized in order to ensure the security of such data in the system 100. That is, the processing may ensure that data related to one entity is not shared with or utilized by other entities that have access to the system 100.

In one configuration, the data sanitizing module 102 includes a scheduler (not shown) configured to pull data from pre-integrated API-based data sources. The data sanitizing module 102 may further include a listener (not shown) for determining if the data is ready to be uploaded to the system 100. The listener is configured to perform any one of the file transfer protocols supported by the data sanitizing module 102 such as, but not limited to, FTP, SFTP, FTPS, HTTP, HTTPS, SMTP, POP3, and the like.

The TS engine 104 is a non-transitory data repository for the normalized data provided by module 102 and/or by the media-link tracking and media-link module 112. The TS engine 104 is configured to transform the normalized dataset into a relaxed user-specific data schema. The relaxed data schema includes the data types, data dimensions, metric dimensions, hierarchy, and aggregation functions for each metric. Thereafter, the TS engine 104 is configured to execute a data transformation process to transform data values in the dataset to meet the relaxed data schema. The data transformation is performed by a plurality of transformation rules. This transformation results in a dataset (hereinafter the "relaxed dataset") that includes relevant data gathered from multiple platforms, organized according to the relaxed data schema as specified by the user.

The TS engine 104 is further configured to analyze the relaxed dataset to compute various measurements of measurable data items included in the relaxed dataset. Such measurements may be related to other to the directly or indirectly to a campaign. For example, campaign related measurements may include a number of impressions, conversion rates, number of "fans", geographic information from where the advertisements where viewed, and so on. Measurements that are indirectly related include, but are not limited to, numbers of customers, demographic makeups of customers (e.g., 50% men and 50% women, 90% adults and 10% children, 60% fans of basketball and 40% fans of baseball, etc.), amounts of sales, weather conditions across the duration of a campaign (e.g., for a thirty day campaign, clear skies on 20 days and rain on 10 days), and so on. Such information can be collected or provided by ad-serving systems, CRM systems, weather services, and so on.

The analysis performed by the TS engine 104 is further configured to include data aggregation, and analytical as well as statistical calculations. For example and without limitation, the statistical measurements for each such data item include an average, a normal distribution, a maximum value, a minimum value, an absolute value, and so on. A measurable data item is any item that that can be aggregated. For example, currency values, conversion rates, a number of hits, a number of clicks, a number of fans, a number of page views, and a number of leads are merely a few examples of measurable data items.

In accordance with another embodiment, the various measurements are generated with respect to one or more campaign objectives defined by the user or preconfigured in the system 100. For example, if the campaign objective is to reach 100,000 fans in a social network, the TS engine 104 is configured to compute the current number of fans and the rate of new fan acquisition, and to predict whether the campaign objective can be met and when. Finally, the TS engine 104 is configured to populate the analyzed data and/or the resulting dataset into the data-mart module 106. The TS engine 104 allows for retrieving the information processed by the UI module 110 without latency. In another embodiment, the TS engine 104 is also configured to store the data mapped to the destination schema in the data warehouse 130 for later usage. This may include, for example, custom querying, service-based analysis (e.g., analysis performed by a Data Scientist team), and re-processing of the stored data.

The various processes performed by the TS engine 104 are discussed in greater detail herein below with respect to FIG. 2. According to the disclosed embodiments, the computation performed by the TS engine 104 is enabled due to the way data is processed and accessed by the data mart module 106. According to various embodiments disclosed in detail below, the data-mart module 106 off-loads data processing by pre-processing the dataset, thereby enabling to retrieval of data without waiting for completion of a specific query.

Specifically, in one embodiment, the data saved in the data-mart module 106 is optimized for providing fast access to the data. This allows producing reports, answering queries, and/or receiving the relevant portions of the aggregated data on the fly without any delay. In another embodiment, the data mart module 106 can save data retrieved from multiple data sources (such as databases, data stores, data warehouses, any combination thereof, and the like). Data retrieved from multiple sources may be joined to provide a complete dataset in response to a user query. That is, the data mart module 106 is optimized for high concurrency, scalability, and availability. In another embodiment, the data mart module 106 enables data modeling flexibility based on a logical data schema. This enables performance of data operations without specific queries and provision of data analytics based on an ever-changing data model. In one embodiment, the data-mart module 106 is realized as a data structure server.

The data warehouse 130 may be communicatively connected to the system 100 or integrated therein. The data warehouse 130 is accessed through the data mart module 106, which is configured to allow accelerated retrieval of the aggregated data stored in the data warehouse 130.

The metadata DB 108 is configured to store and maintain metadata utilized by the system 100, and in particular by the TS engine 104, for processing and analyzing of campaign data. The metadata DB 108 may be integrated in the system 100 (as shown in FIG. 1) or communicatively connected thereto. In one embodiment, the metadata DB 108 is realized as an online transaction processing (OLTP) database which is configured to support the various processing performed by the system 100.

The management UI module 110 is configured to provide access to the system 100 from various client devices. The client devices may include, for example, a PC, a smart phone, a tablet computer, and the like. The communication with the management UI module is facilitated through an application executed over the client device. Such an application may include a web browser. In one embodiment, the management UI module 110 implements a set of application programming interfaces (API) to allow communication with the client device.

The TS engine 104 can analyze data provided by the data sanitizing module 102, where such data is typically loaded into the system 100 "off-line." That is, the data sources connected to the module 102 provide data as gathered, over time, from different advertising platforms. As such, the data sources are adapted to upload or "push" data to the system 100 as the campaign analytics are published by each respective advertising platform.

In another configuration, the TS engine 104 can analyze "real-time" data collected by the media-link module 112 with regard to one or more online campaigns. The media-link module 112 is configured to tap into advertising platforms and to track their entire media plans. The media plan is typically defined by a media agency and entails media platforms for the campaign. The media plan is designed to find the specific combination of media to best achieve the marketing campaign objectives.

Therefore, the media-link module 112 is configured to gather other data related to advertising campaigns in real time when such data is published and/or collected by an advertising platform. The data gathered by the media-link module 112 is input to the sanitizing module 102. An advertising platform may be an ad-serving system of an ad-serving company, a social media website, a content publisher, and the like. An exemplary and non-limiting media link module is described further in the above-referenced U.S. patent application Ser. No. 14/077,951, assigned to the common assignee, which is hereby incorporated by reference for all that it contains.

Each, some, or all of the modules of the system 100 may be realized by a processing system. The processing system may comprise or be a component of a larger processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

Figure 2:
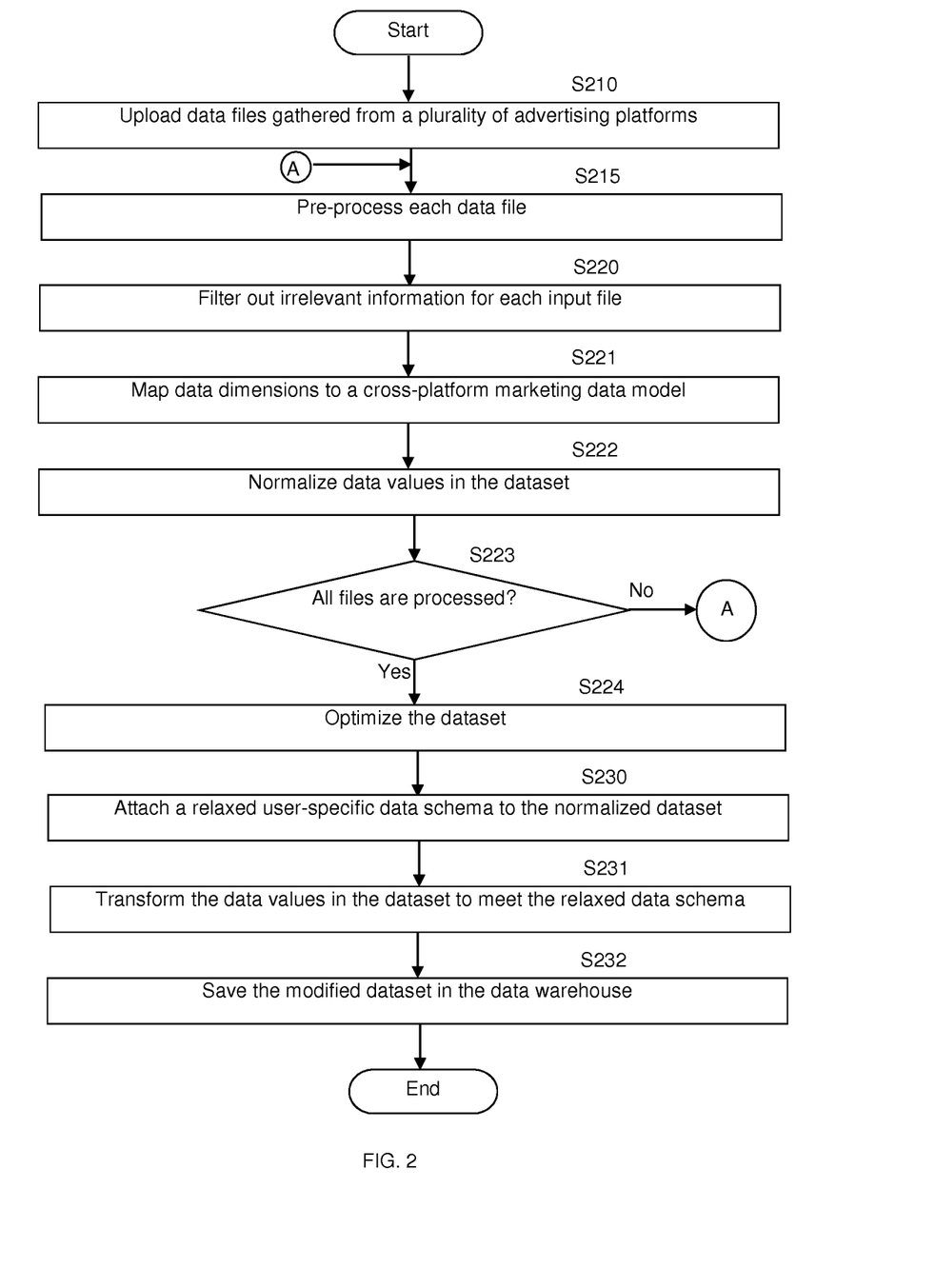
FIG. 2 is a flowchart illustrating a method for cross-platform analytics according to an embodiment.

FIG. 2 shows an exemplary and non-limiting flowchart 200 illustrating a method for providing cross-platform analytics according to an embodiment. In an exemplary embodiment, the method can be performed by the system 100.

In S210, data gathered by a plurality of advertising platforms regarding one or more advertising campaigns is uploaded. In an embodiment, the data files may be uploaded to a data sanitizing module (e.g., the data sanitizing module 102). The uploaded data may be received from ad-serving companies, social media websites, advertisement agencies, and the like. The received data may be provided to the module 102 in either pull or push operation modes.

As noted above, a data sanitizing module may support a plurality of protocols for communication with the data sources and platforms for receiving data. In one embodiment, input data may be in any data format, such as structured, unstructured, and standardized (e.g., Excel, XML, and the like). For the sake of simplicity and without limiting the scope of the disclosed embodiments, the data may be uploaded in the form of files.

Optionally, in S215, the received data is pre-processed. This pre-processing includes, but is not limited to, decryption of data received in an encrypted form. With this aim, a data sanitizing module (e.g., the data sanitizing module 102) may maintain or receive the relevant encryption keys from the data owner over a secured connection. In one embodiment, S215 further includes identification and association of each input data file with its respective data owner entity.

In S220, each input data file is parsed to filter out irrelevant information contained in the file. As a non-limiting example, an Excel file is parsed to identify blank rows and to remove such rows from the file. As another non-limiting example, headers and commentary information are filtered out as well.

In S221, data dimensions (fields) in the input file are mapped to a cross-platform marketing data model. This cross-platform marketing data model is designed according to the disclosed embodiments to support marketing and analytical metrics of online advertising. The cross-platform marketing data model defines at least one data dimension and at least one metric dimension.

Examples for such metric dimensions include, but are not limited to, impression counts, click counts, conversion counts, media costs, placement, and so on. The data model may also define metric dimensions such as currency, geographical location, campaign name, a default value, and the like. As a non-limiting example, a metric dimension that relates to impression and/or click counts may correspond to a success metric such as, e.g., that a high number (e.g., above a predefined threshold) of impression and/or click counts demonstrates a high level of success of the campaign. The cross-platform marketing data model further defines the relationship between objects, their hierarchies, their data types, and their formats. It should be noted that, in an embodiment wherein the steps of flowchart 200 are performed via the system 100 of FIG. 1, the system 100 may be preprogrammed with the cross-platform marketing data model which may be further customized by a user of the system.

The mapping of metric dimensions (fields) in the input file to the cross-platform marketing data model includes analyzing the input file to determine a data type of each field and field name, matching between a source field name and a metric dimension in the model based in part on the data type and the field name. For example, if a source field name in the input file is "clicks", the source field name can be mapped to a metric dimension "delivery clicks" in the predefined data model. The mapping is performed for each metric dimension or for a predefined set of metric dimensions in the input file. Data entries that cannot be mapped to the metric dimensions in the cross-platform marketing data model are placed in the default value dimensions. The result of S221 is a dataset being organized and functioning as defined in the cross-platform marketing data model.

In S222, data values in the dataset are normalized to be represented in a unified notation. In one embodiment, data values of common data dimensions are normalized. For example, common data dimensions are related to data entries likely to appear in most of the files input to a data sanitizing module (e.g., the data sanitizing module 102). Examples for common data dimensions include, but are not limited to, date, currency, country, zip code, and so on. The data normalization may include, for example, representing a data dimension (field) in a notation of 'MM/DD/YYYY', converting currency to USD (using a current exchange rate), representing a country code using 2 characters, and so on. The unified notation is determined by the format of the respective data dimension as defined in the cross-platform marketing data model. The result of S222 is a normalized dataset being organized and functioning as defined in the cross-platform marketing data model.

In S223, a check is made to determine if all input files have been processed and, if so, execution continues with S224; otherwise, a new input file is selected and execution returns to S215. The execution reaches S224 when data contained in all the input files are aggregated in the normalized dataset and/or are organized to function as defined in the cross-platform marketing data model. In S224, the normalized dataset is further optimized to allow faster manipulation of the data. In one embodiment, the optimization includes saving the dataset in a column-based format. It should be noted that, during the manipulation and organization of input data files, data is saved in a storage device, which may be a database, a data store, the data warehouse 130, and the like.

In S230, a dynamic (relaxed) data schema is attached to the normalized dataset. The dynamic data schema comprises two data schemas (or models): a logical data schema, and a physical data schema. The physical data schema defines where the data source (e.g., a datastore) maintains the actual data. Examples for physical data schemas include, but are not limited to, a star schema, a snowflake schema, and the like.

The logical data schema includes data types, data dimensions, metric dimensions, a hierarchy of data fields, and an aggregation function for each metric. In an embodiment, the logical data schema determines how data values from the normalized dataset will be read and manipulated. In an embodiment, the dynamic data schema is user-specific, and as such can be frequently modified with frequencies such as, for example, per campaign, per customer (of the user), per advertising platform, and so on. For example, the dynamic data schema can first be configured to include data from advertising campaigns running through video channels (e.g., YouTube®) and the dynamic data schema may be subsequently modified to include data related to campaign running through social media channels (e.g., Facebook®). In addition, each metric and/or data dimension can be updated based on the user's requirements. As an example, a user may require that information related to the number of Facebook® users designated as fans of a particular campaign or advertisements therein be collected. As a result, a "fans" dimension can be added to measure a number of fans of a Facebook® page.

In S231, data values in the normalized dataset are transformed to comply with the logical portion of the dynamic data schema. The data transformation is performed via a plurality of transformation rules. A transformation rule defines at least one action to be performed on the data. Such actions may include, but are not limited to, alteration, classification, and segmentation. For example, a segmentation rule may define that all impressions counted during a specific time period (e.g., a particular weekend) will be grouped together. As another example, personal information recorded in the notation 'first-name_last-name_age_gender' is expanded into different individual attributes, such as 'first name', 'last name', 'age,' and 'gender'. This expansion allows aggregating and performing analytic functions on each attribute individually. Performing analytic functions per attribute may reduce the computing resources used or allow distribution of computer resource usage based on, e.g., availability of computing resources. S231 results in a modified dataset that meets the definitions of the relaxed data schema.

In S232, the data transformed to comply with the dynamic data schema is saved in a data warehouse (e.g., the data warehouse 130) for later usage.

In an embodiment, the modified datasets and the dynamic data schema can be utilized by a data mart module (e.g., the data mart module 106) to respond to end-user queries as discussed in detailed below.

Figure 3:
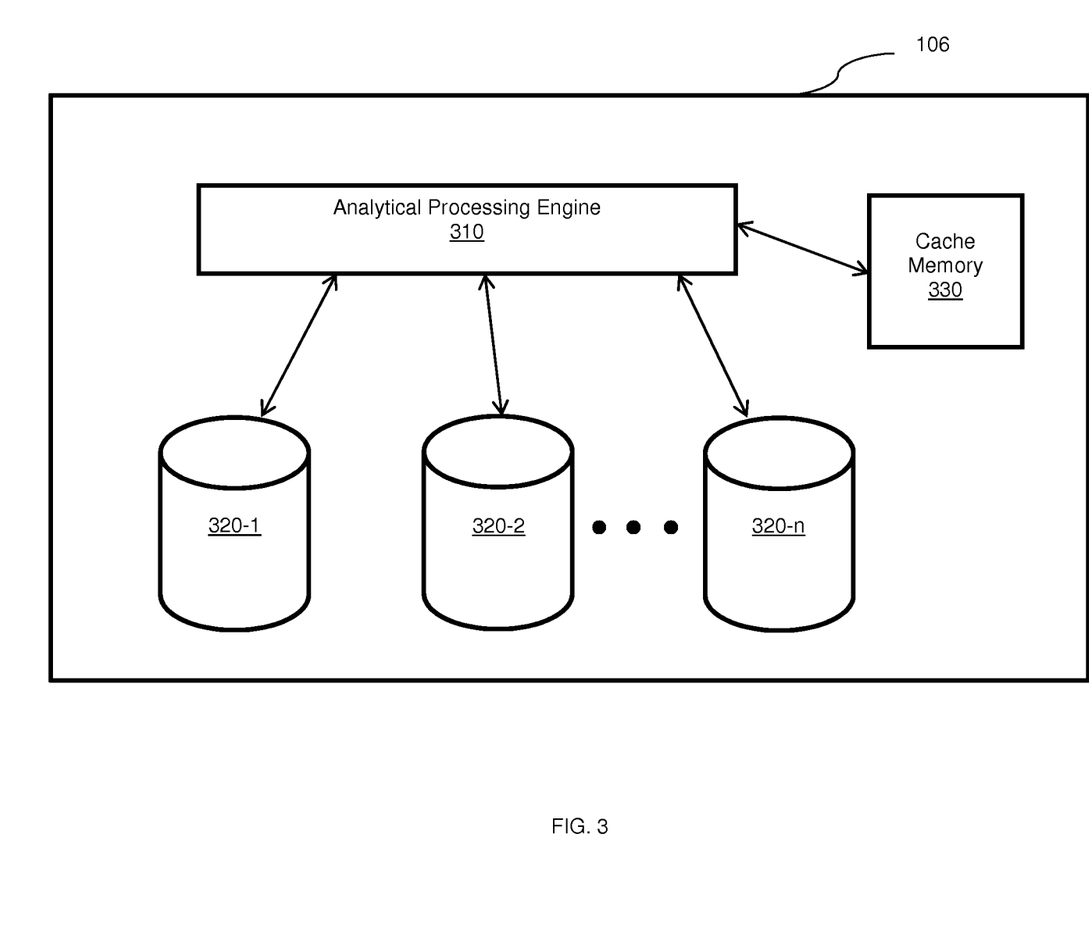
FIG. 3 is a block diagram of a data mart module constructed according to an embodiment.

FIG. 3 shows an exemplary and non-limiting block diagram of the data mart module 106 constructed according to one embodiment. The data mart module 106 can serve different functions such as, but not limited to, dashboards, custom reporting, and scheduled reports, as well as advanced forecasting and what-if scenario building.

In the embodiment illustrated in FIG. 3, the data mart module 106 includes an analytical processing engine 310, a plurality of data stores 320-1 through 320-N (hereinafter referred to individually as a datastore 320 and collectively as datastores 320, for simplicity purposes and without limitation on the disclosed embodiments), and a cache memory 330. In certain embodiments, some or all of the datastores 320 may be external to the data mart module 106. Each datastore 320 may include a different (normalized) dataset, each of which may be related to a different campaign, a different customer, data gathered from different time periods, combinations thereof, and so on.

The analytical processing engine 310 is configured to allow efficient and fast processing of queries based on a dynamic data model defined by the TS engine 101. To this end, according to one embodiment, the analytical processing engine 310 is configured to receive an end-user query, analyze the end-user query, access data stored in or more of the datastores 320 to receive sub-result datasets, and combine the retrieved sub-result datasets into a complete result dataset which serves as response to the user query. In an embodiment, the analysis of the end-user query is performed based on the dynamic data model. This includes parsing the end-user query, determining the various data dimensions and/or metrics, generating a sub-SQL queries to retrieve the sub-result datasets, and combining the sub-result datasets. As will be discussed below in more detail, in an embodiment, combining the sub-result datasets may include aggregation and/or join operations. In another embodiment, the query may be broken down to sub queries so as to allow parallel execution of the sub queries.

It should be emphasized that the end-user query is not an SQL query, but can be query (e.g., Managed DirectX, free text in structured query language, and so on) supported by another type of application program interface. As an example, the end-user query may be "what are the total of impressions of an ad during last week?" or "what was the increase in sales across all product lines in France during 2013?" For such free text user queries, the user does not specify (and does not know) where the actual data is stored or what data dimensions are defined that should be used. This allows users, such as business-users, who are not necessarily familiar with programming and/or SQL queries, to define and determine intuitive queries for analyzing the data interactively and to make discoveries that can improve the business.

By means of the UI management module 110, users interact with the elements of the data mart module 106 in order to submit queries as well as to view and retrieve the outputs generated by the system 100. With this aim, the management UI module 110 provides a suite of data visualization functions including, but not limited to, dashboards, customized and embeddable analytics modules, custom reports, and scheduled reports.

In an embodiment, the analytical processing engine 310 is designed to provide a query API that supports "Pivot Table" like-API, enabling operations on Rows, Columns, Dimensions, Measurements, Filters, Sorting, Aggregations, and so on. In a further embodiment, the analytical processing engine 310 provides a pre-defined and fast access to the data model generated by the TS engine 104, thereby enabling efficient utilization by the dashboards and analytics modules.

In one embodiment, the analytical processing engine 310 maps different data points into summaries by key and updates the aggregations. This summary mapping enables accessing the aggregated data in O(1) complexity. Each such summary can be provided for time-based analytics. In order to "compress" this problem into a key/value store, date-string suffixes are appended to the keys, e.g., "delivery_by_day:nike:2012-01-01". Having the gathered data split by day allows calculation of statistics (such as, e.g., totals, averages, and unions) over arbitrary user-defined time periods. For example, a user can select the time range "Jan. 1, 2012-Feb. 1, 2012", and the statistics are computed by summing the results of multiple "keys get" operations conducted on each day in the range.

In another embodiment, aggregation operations may also include join operations performed for different result sets retrieved from any or all of the datastores 320. Since such join operations are not performed by any of the datastores 320, the processing time of such operations is significantly reduced. In an embodiment, all aggregation and/or join operations are performed in-memory on the server side and not on the requesting client side.

The operation of the analytical processing engine 310 is not necessarily restricted to a specific physical data schema implemented by the datastores 320 or any other physical data warehouse.

The cache memory 330 is designed to store the results of previous queries submitted to the system 100. By caching the results of queries, responses to repeated queries can be reused, thereby avoiding performance of previously computed operations and resulting in decreased usage of computing resources. The cached results are available across the sessions (i.e. for use by sessions other than the one that first executed the query) and across platforms.

Figure 4:
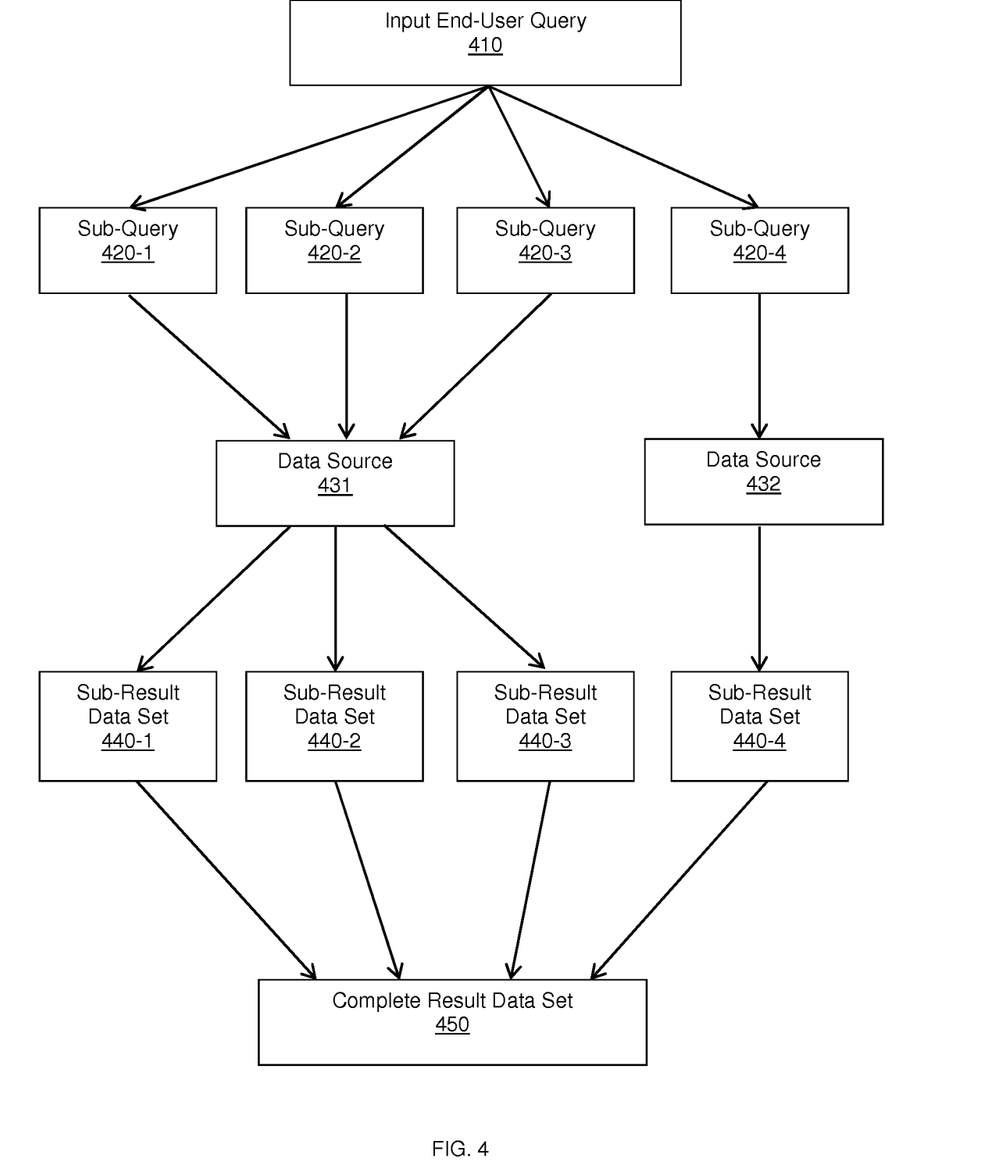
FIG. 4 is a diagram illustrating the operation of an analytical processing engine according to an embodiment.

FIG. 4 shows an exemplary diagram illustrating the operation of the analytical processing engine 310 according to one embodiment. In this embodiment, the analytical processing engine 310 is configured with a dynamic data schema. As noted above, a dynamic data schema comprises two data schemas (or models): a logical data schema, and a physical data schema. The physical data schema defines which data source the actual data resides in. The data source may be, for example, a datastore 320, a database, a data warehouse, and the like. The datastore 320 maintains repositories, such as databases, flat files, and the like. The logical data schema includes data types, data dimensions, metric dimensions, hierarchies of data fields, an aggregation function for each metric, an explanation of how data values from the normalized dataset will be read and manipulated, and so on.

As a non-limiting example, the logical data schema may include the following data dimensions: TIME, MEDIA_BUY, and CONVERSION_TYPE. In that example, the metric dimensions are: IMPRESSIONS, and CONVERSIONS. The physical data schema of the dynamic data schema defines data dimensions' values that can be retrieved from a first data source (e.g., a datastore) 431 and the impressions that can be retrieved from a second data source (e.g., a database) 432 respective of the metric dimensions. Dimensions are described further herein above with respect to FIG. 2.

An input end-user query 410 is received and processed by the analytical processing engine 310. Specifically, the input end-user query 410 is analyzed and a plurality of sub-queries such as, for example, sub-queries 420-1 through 420-4, are generated. The analysis of the query 410 includes parsing the query to determine the relevant data and/or metric dimensions, and generating sub-queries 420-1 through 420-4 respective of the dynamic data model using information obtained from a first data source 431 and a second data source 432.

As a non-limiting example, the end-user query 410 may be "what is the total number of conversions per conversion type for impressions per media buy during the last week?" Parsing of this query would result in filtering of the following important keywords: "impressions", "last week", "conversion type", "conversions", and "media buy". Thus, the data and metric dimensions to be queried are TIME, MEDIA_BUY, IMPRESSIONS, CONVERSION_TYPE, and CONVERSIONS.

The analysis results in 4 different sub-queries 420-1 through 420-4. In a non-limiting example, the sub-query 420-1 relates to a number of impressions, the sub-query 420-2 obtains the different conversion types of conversions, the sub-query 420-3 obtains the number of conversions, and the sub-query 420-4 obtains the budget (media buy) spent during the last two weeks. The sub-queries 420-1 through 420-3 are submitted to the data source 431 and the sub-query 420-4 is submitted to the data source 432.

Processing each of the sub-queries 420-1 through 420-4 in the respective data sources 431 and/or 432 results in retuning respective sub-result datasets 440-1 through 440-4. Then, join and/or aggregation operations are performed on the sub-result datasets 440-1 through 440-4. Specifically, data of the same dimensions can be aggregated and different data and/or metric dimensions are joined. The analytical processing engine 310 is configured to analyze the sub-result datasets to determine which operation should be performed. The determination is based on the dynamic data model. As a result of the join and/or aggregation operations, the sub-result datasets 440-1 through 440-4 are combined into a complete result dataset 450.

Following the above examples, impressions and conversions per conversion type are aggregated, while the impressions per media buy and conversion type are joined. For instance, for a media buy B1, the total number of impressions is 200, and the number of conversions for conversion types C1 and C2 are 12 and 27, respectively. To generate the complete dataset, a join operation would be performed to combine the number of impressions with the total number of conversions. That is, the complete dataset 450 in response to the query would be <B1, 37, 200>. It should be noted that only the conversions are aggregated, while the number of impressions are joined to the aggregated conversion numbers.

Figure 5:
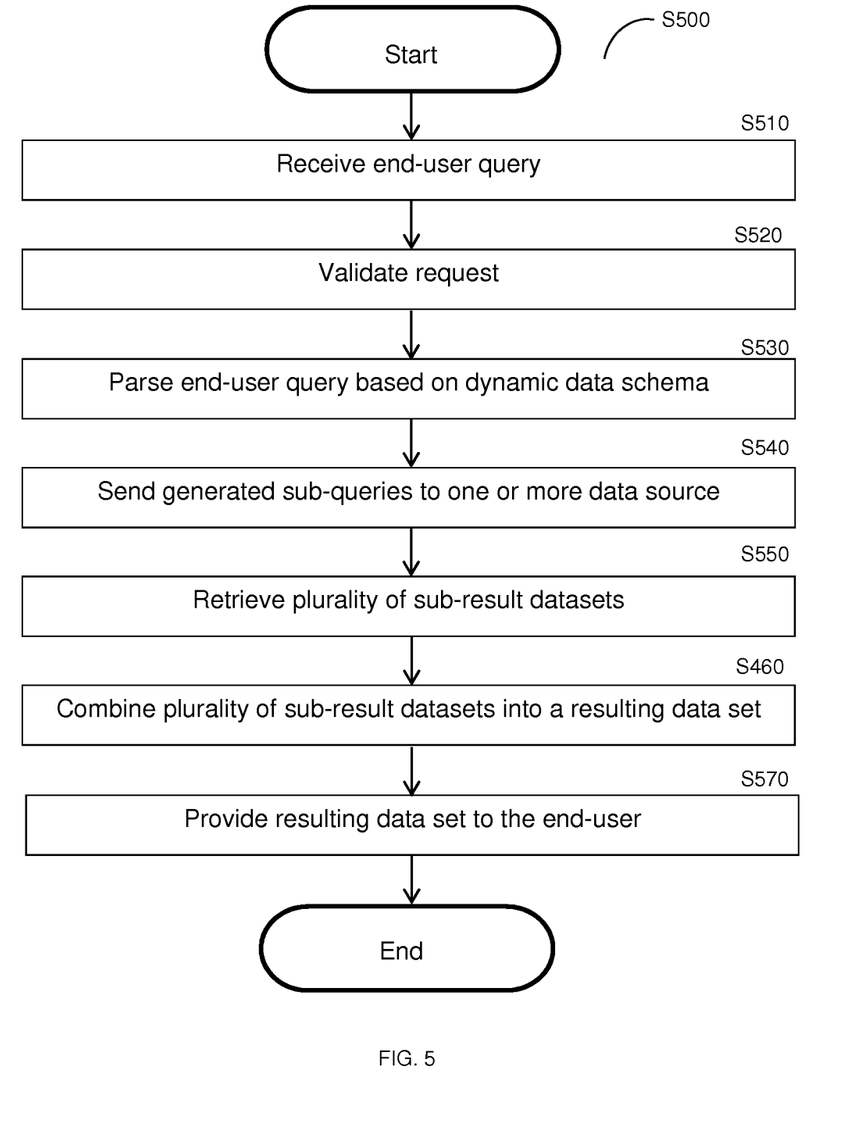
FIG. 5 is a flowchart illustrating providing cross-platform data analytics to an end user respective of an end user query according to an embodiment.

FIG. 5 shows an exemplary and non-limiting flowchart 500 illustrating providing cross-platform data analytics to an end user respective of an end user query according to an embodiment. In an embodiment, the steps of flowchart 500 may be performed by a data mart (e.g., the data mart 106). In S510, an end-user query for cross-platform data analytics is received. The end-user query may be received from, for example, an HTML user interface. Optionally, in S520, the request is validated. In an embodiment, if validation of the request is unsuccessful, execution terminates.

In S530, the user query is parsed based on a dynamic data schema. In an embodiment, parsing the end-user query, analyzing the end-user query, and generating a plurality of sub-queries are based on data and/or metric dimensions defined and the logical schema of the dynamic data schema. Depending on the data stored in one or more data sources (e.g., the datastores 320), the generated sub-queries may be SQL queries. S530 further includes determining, based on the physical schema of the dynamic data schema, which data sources (e.g., the datastores 320) contain relevant business data to submit the sub-queries.

Data dimensions of the logical schema represent attributes about the data such as, but not limited to, time periods, geographical locations, web sources (e.g., a website, a web server, etc.), costs, sales volume, revenue, reaches of campaigns (i.e., a number of users that have experienced the campaign), and so on. Metrics include quantifiable values associated with one or more metric dimensions and may be, but are not limited to, a week, a month, a year, a monetary value, a number of impressions, a number of clicks, and so on.

In another embodiment, parsing further includes adding dimensions and/or granularities that are needed to generate appropriate sub-queries to be submitted to one or more data sources (e.g., the datastores 320) containing relevant business data.

Parsing the end-user query allows an end user who is not a database administrator or otherwise a query writer to submit a query via, e.g., a user interface hosted on a web server. Once the query is parsed, appropriate information may be retrieved from the data source, thereby permitting the user to view the data without requiring third party intervention. Further, parsing the queries as they come in allows incoming queries to be analyzed based on the newest logical schema, as the logical schema is adaptively updated based on new data.

In S540, a plurality of generated sub-queries is sent in parallel to the one or more data sources containing the relevant business data. Such parallel sending further permits parallel data retrieval of multiple pieces of information respective of a single incoming query. This parallel data retrieval permits maximum utilization of massively parallel processing (MPP) databases, thereby resulting in more efficient data retrieval. In S550, a plurality of sub-result datasets is retrieved respective of the plurality of parallel sub-queries.

In S560, all sub-result datasets of the plurality of sub-result datasets are combined into a single resulting data set such as, e.g., the complete result data set 450. In an embodiment, S560 includes analyzing the retrieved sub-result datasets to determine which, if any, of the sub-result datasets are of the same data and/or metric dimensions in order to determine which operations should be performed in to order to provide a complete dataset that addresses the input end-user query. Typically, sub-result datasets of the same data and metric dimensions are aggregated, while different data or metric dimensions are joined together. In an embodiment, S560 includes determining which of the different data or metric dimensions can be joined together in order to return meaningful information to the end-user. Such determination may be based on the dynamic data model.

In S570, the single resulting data set is provided to the end-user. In an embodiment, the single resulting set may be provided in a JavaScript Object Notation (JSON) format. In another embodiment, the sub-result datasets and/or the complete dataset may be cached in the cache 310.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing big data analytics responsive to dynamically-changing data models, the method comprising:
   receiving a user query comprising a natural language question;
   accessing a dynamic data schema comprising:
      a logical data schema defining data dimensions and metric dimensions; and
      a physical data schema defining where data is stored;
   identifying a data dimension and a metric dimension within the user query by parsing, based on the logical data schema of the dynamic data schema, the user query;
   determining, based on the physical data schema, that data of the data dimension is stored in a first data source and that data of the metric dimension is stored in the first data source and in a second data source, wherein the user query does not directly identify the first data source or the second data source;
   generating, based on the determining, a plurality of sub-queries comprising:
      a first sub-query for data of the metric dimension;
      a second sub-query for data of the metric dimension; and
      a third sub-query for data of the data dimension;
   sending, based on the determining, the first sub-query and the third sub-query to the first data source and the second sub-query to the second data source;
   receiving a plurality of sub-result datasets comprising:
      a first sub-result dataset from the first data source responsive to the first sub-query;
      a second sub-result dataset from the second data source responsive to the second sub-query; and
      a third sub-result dataset from the first data source responsive to the third sub-query;
   generating a sum by summing the first sub-result dataset and the second sub-result dataset in response to the first sub-result dataset and the second sub-result dataset both being of the same metric dimension; and
   generating a single resulting data set based on the logical schema of the dynamic data schema by executing a join operation on the sum and the third sub-result dataset, wherein the join operation and the summing are different operations.

2. The method of claim 1, further comprising:
   calculating, based on the single resulting data set, another metric dimension; and
   determining, based on the another metric dimension, another data dimension.

3. The method of claim 1, further comprising:
   obtaining, before receiving the user query, first data values and second data values gathered by a plurality of advertising platforms regarding at least one advertising campaign;
   determining the first data values and the second data values are of the data dimension;
   normalizing the first data values and the second data values into a unified notation;
   transforming the first normalized data values and the second normalized data values based on the logical schema; and
   storing, before receiving the user query but after the transforming, the first normalized data values and the second normalized data values in the first data source, wherein the third sub-result dataset comprises at least one of the first data values and the second data values.

4. The method of claim 3, wherein the transforming the first normalized data values and the second normalized data values further comprises:
transforming the first normalized data values and the second normalized data values based on a plurality of transformation rules.

5. The method of claim 4, wherein each transformation rule of the plurality of transformation rules is an alteration rule, classification rule, or segmentation rule.

6. The method of claim 1, wherein the dynamic data schema is user-specific.

7. The method of claim 1, further comprising:
adding, to each of the plurality of sub-queries, at least one granularity.

8. The method of claim 1, wherein the physical data schema is a star schema or a snowflake schema.

9. The method of claim 1, wherein the first data source of the plurality of data sources is managed by a different entity than the second data source of the plurality of data sources.

10. The method of claim 1, wherein the first data source of the plurality of data sources uses a different data model than the second data source of the plurality of data source.

11. The method of claim 1, wherein the data dimension comprises at least one selected from a group consisting of media buy and conversion type, and wherein the metric dimension comprises at least one selected from a group consisting of impressions and conversions.

12. A non-transitory computer readable medium having instructions stored thereon that, when executed by at least one computing device, cause the at least one computing device to perform operations comprising:
receiving a user query comprising a natural language question;
accessing a dynamic data schema comprising:
a logical data schema defining data dimensions and metric dimensions; and
a physical data schema defining where data is stored;
identifying a data dimension and a metric dimension within the user query by parsing, based on the logical data schema of the dynamic data schema, the user query;
determining, based on the physical data schema, that data of the data dimension is stored in a first data source and that data of the metric dimension is stored in the first data source and in a second data source, wherein the user query does not directly identify the first data source or the second data source;
generating, based on the determining, a plurality of sub-queries comprising:
a first sub-query for data of the metric dimension;
a second sub-query for data of the metric dimension; and
a third sub-query for data of the data dimension;
sending, based on the determining, the first sub-query and the third sub-query to the first data source and the second sub-query to the second data source;
receiving a plurality of sub-result datasets comprising:
a first sub-result dataset from the first data source responsive to the first sub-query;
a second sub-result dataset from the second data source responsive to the second sub-query; and
a third sub-result dataset from the first data source responsive to the third sub-query;
generating a sum by summing the first sub-result dataset and the second sub-result dataset in response to the first sub-result dataset and the second sub-result dataset both being of the same metric dimension; and
generating a single resulting data set based on the logical schema of the dynamic data schema by executing a join operation on the sum and the third sub-result dataset, wherein the join operation and the summing are different operations.

13. The non-transitory computer readable medium of claim 12, the operations further comprising:
obtaining, before receiving the user query, first data values and second data values gathered by a plurality of advertising platforms regarding at least one advertising campaign;
determining the first data values and the second data values are of the data dimension;
normalizing the first data values and the second data values into a unified notation;
transforming the first normalized data values and the second normalized data values based on the logical schema; and
storing, before receiving the user query but after the transforming, the first normalized data values and the second normalized data values in the first data source, wherein the third sub-result dataset comprises at least one of the first data values and the second data values.

14. The non-transitory computer readable medium of claim 12, wherein the data dimension comprises at least one selected from a group consisting of media buy and conversion type, and wherein the metric dimension comprises at least one selected from a group consisting of impressions and conversions.

15. A system for providing big data analytics responsive to dynamically-changing data models, the system comprising:
a memory; and
at least one processor coupled to the memory and configured to:
receive a user query comprising a natural language question;
access a dynamic data schema comprising:
a logical data schema defining data dimensions and metric dimensions; and
a physical data schema defining where data is stored;
identify a data dimension and a metric dimension within the user query by parsing, based on the logical data schema of the dynamic data schema, the user query;
determine, based on the physical data schema, that data of the data dimension is stored in a first data source and that data of the metric dimension is stored in the first data source and in a second data source, wherein the user query does not directly identify the first data source or the second data source;
generate, based on the determining, a plurality of sub-queries comprising:
a first sub-query for data of the metric dimension;
a second sub-query for data of the metric dimension; and
a third sub-query for data of the data dimension;
send, based on the determining, the first sub-query and the third sub-query to the first data source and the second sub-query to the second data source;
receive a plurality of sub-result datasets comprising:
a first sub-result dataset from the first data source responsive to the first sub-query;
a second sub-result dataset from the second data source responsive to the second sub-query; and a third sub-result dataset from the first data source responsive to the third sub-query;

generate a sum by summing the first sub-result dataset and the second sub-result dataset in response to the first sub-result dataset and the second sub-result dataset both being of the same metric dimension; and generate a single resulting data set based on the logical schema of the dynamic data schema by executing a join operation on the sum and the third sub-result dataset, wherein the join operation and the summing are different operations.

16. The system of claim 15, the at least one processor further configured to:

calculate, based on the single resulting data set, another metric dimension; and determine, based on the another metric dimension, another data dimension.

17. The system of claim 15, the at least one processor further configured to:

obtain, before receiving the user query, first data values and second data values gathered by a plurality of advertising platforms regarding at least one advertising campaign;

determine the first data values and the second data values are of the data dimension;

normalize the first data values and the second data values into a unified notation;

transform the first normalized data values and the second normalized data values based on the logical schema; and store, before receiving the user query but after the transforming, the first normalized data values and the second normalized data values in the first data source, wherein the third sub-result dataset comprises at least one of the first data values and the second data values.

18. The system of claim 17, wherein to transform the first normalized data values and the second normalized data values, the at least one processor is configured to:

transform the first normalized data values and the second normalized data values based on a plurality of transformation rules.

19. The system of claim 18, wherein each transformation rule of the plurality of transformation rules is an alteration rule, classification rule, or segmentation rule.

20. The system of claim 15, wherein the dynamic data schema is user-specific.

21. The system of claim 15, the at least one processor further configured to:

add, to each of the plurality of sub-queries, at least one granularity.

22. The system of claim 15, wherein the data dimension comprises at least one selected from a group consisting of media buy and conversion type, and wherein the metric dimension comprises at least one selected from a group consisting of impressions and conversions.

* * * * *